United States Patent [19]

Henning

[11] Patent Number: 4,538,235
[45] Date of Patent: Aug. 27, 1985

[54] MICROCOMPUTER RETRIGGERABLE INTERVAL COUNTER

[75] Inventor: Jerrold V. Henning, Anaheim, Calif.

[73] Assignee: Rockwell International Corporation, El Segundo, Calif.

[21] Appl. No.: 409,485

[22] Filed: Aug. 19, 1982

[51] Int. Cl.³ .............................................. G06F 7/00
[52] U.S. Cl. ........................................ 364/569; 377/20
[58] Field of Search ............... 364/569, 550, 551, 143, 364/144, 183; 377/20, 16

[56] References Cited

U.S. PATENT DOCUMENTS

| | | | |
|---|---|---|---|
| 4,168,525 | 9/1979 | Russell | 377/20 X |
| 4,176,337 | 11/1979 | Aechter et al. | 364/569 X |
| 4,179,611 | 12/1979 | Mill et al. | 377/16 |
| 4,258,250 | 3/1981 | Schmidt | 377/16 X |
| 4,303,983 | 12/1981 | Chaborski | 364/569 |
| 4,350,953 | 9/1982 | Best et al. | 364/569 X |
| 4,365,306 | 12/1982 | House et al. | 364/569 X |
| 4,367,051 | 1/1983 | Inoue | 364/569 X |
| 4,399,354 | 8/1983 | Schaeffer | 377/20 X |

FOREIGN PATENT DOCUMENTS

WO83/02015 11/1981 PCT Int'l Appl. .................. 377/20

Primary Examiner—Edward J. Wise
Attorney, Agent, or Firm—H. Fredrick Hamann; Randall G. Wick; David J. Arthur

[57] ABSTRACT

A microcomputer interval counter circuit for detecting the time interval between input signals and for determining when the detected time interval exceeds a preset time interval.

The interval counter circuit includes a latch connected to a bus of the microcomputer for storing the preset time interval duration, a counter circuit connected to the latch and to the microcomputer clock for decrementing a number stored in the counter and producing a timing indication as an interrupt to the microcomputer processor, and an OR gate connected to load the counter from the latch when an input signal is received, or when the counter circuit fully decrements.

20 Claims, 3 Drawing Figures

MICROCOMPUTER RETRIGGERABLE INTERVAL COUNTER

RELATED APPLICATIONS

This application is related to U.S. patent application Ser. No. 409,483 filed Aug. 19, 1982, and Ser. No. 409,484 filed Aug. 19, 1982, and assigned to the present assignee, the disclosures of which are incorporated herein by reference.

FIELD OF THE INVENTION

This invention relates generally to the field of electronic digital computer devices and pertains more particularly to a microcomputer interval counter for measuring the occurrence of external events and for detecting when the time between external events exceeds a preset time threshold.

BACKGROUND OF THE INVENTION

Interval counters are commonly used as event counters for measuring the occurrence of external events. Interval counters are commonly used in electronic circuitry for measuring the receipt of sequential input signals. The input signals may be produced by a wide variety of external electronic circuitry, such as circuitry used to detect the rotation of a spur gear. For example, an interval counter may be used as a missing pulse detector in order to detect the position of the spur gear by responding to a missing tooth on the gear. In the case of a spur gear, each gear tooth passing in front of a sensor creates an event and a missing tooth results in a break in the regular sequence of events. An interval counter is a general purpose device which may be used in order to accomplish a wide variety of tasks which require the monitoring of external events.

An analogous device to a retriggerable interval counter is a retriggerable "one-shot" or monostable multivibrator. A retriggerable "one-shot" is a digital integrated circuit which is used in order to produce an output interval signal each time that it is triggered. The "one-shot" will reset itself to produce a second interval signal if a second trigger is received after a first trigger. That is, the "one-shot" is retriggerable so that it will produce an output interval signal even through it has been previously triggered.

Because of the advent of the demand for miniaturized equipment that allows computer processor control over the detection of external events, prior interval counter circuitry has been inadequate to provide the needed performance.

SUMMARY OF THE INVENTION

It is an object of the invention to provide interval counter circuitry for measuring the occurrence of events through the use of a programmed microcomputer which responds to input signals produced by the events to be measured, and particularly to detect when the time between events is greater than a preset time duration.

It is another object of the invention to provide a microcomputer having an interval counter integrated therewith so that a microcomputer contained in a single integrated circuitry package may be used to measure external events.

A further object of the invention is to provide a microcomputer having an interval counter which automatically resets itself for retriggering after each input signal is received.

Another object of the invention is to provide an interval counter which incorporates a digital storage latch for containing a digital number corresponding to a preset time duration which is used by the interval counter circuitry in order to selectively reject intervals shorter than the preset time duration.

It is still another object of the invention to provide a microcomputer with an interval counter, wherein the interval counter periodically produces timing indications (with a period corresponding to a preset time duration) without requiring control by the processor of the microcomputer.

Another object of the invention is to provide a mirocomputer with an interval counter having a counter register, the contents of which may be determined by the processor of the microcomputer so that the processor may precisely determine the elapsed time measured by the interval counter.

The interval counter circuitry of this invention allows a microcomputer to measure the occurrence of external events by sensing input signals corresponding to the events. The interval counter circuitry allows the microcomputer to detect a sequence of input signal, and to respond when the time elapsed between two sequential input signals exceeds a threshold time interval. The measurement of events is performed by the microcomputer using an interrupt scheme in which the interval counter circuitry produces timing indication interrupts if a time interval has occurred between external events. The time interval period for the timing indications produced by the interval counter is set by a number which is loaded into an interval counter latch by the microcomputer processor. The number loaded in the interval counter latch corresponds to a preset time duration which is used by the interval counter circuitry in order to control when an interrupt is provided to the processor during time interval measurement, and in order to set a threshold time duration used by the interval counter so that short time intervals (intervals shorter than the threshold time duration) do not result in processor interrupts. The interval counter circuitry is connected to the data bus of the microcomputer and functions as a part of the microcomputer itself. The circuitry of the interval counter is compatible with the processor circuitry so that the interval counter may be incorporated into a microcomputer on a single integrated circuit chip.

The interval counter circuitry includes a decrementing counter register which decrements in response to the microcomputer clock. A processor interrupt is produced each time the counter register decrements itself to zero and underflows. A latch is connected between the microcomputer data bus and the counter register so that a preset number may be transferred from the processor to the interval counter latch for use by the counter register. An OR gate is provided to control the loading of the counter register from the latch so that loading occurs when the counter register underflows, when a transition is detected in the input signal, or when a control command is received from the microcomputer processor. Outputs of the control register are connected to the microcomputer data bus so that the processor may read the contents of the control register at any time. The use of controlled latch and counter register for the interval counter circuitry allows the detection of intervals to be performed without requiring the processor to execute instructions to monitor the input signal status after each clock pulse. The counter register is automatically reloaded from the latch after each input signal transistion so that the interval counter may be retriggered without requiring acting by the processor. Therefore, the construction allows detection of time intervals between input signals without requiring undue amounts of attention from the processor. The interval counter circuitry operates independently of the microcomputer processor in order to measure the time duration between events by counting clock signals in a decrementing counter, and in order to automatically reset its counter as each input signal is received. The interval counter circuitry operates under the control of the microcomputer processor in order to set the threshold time duration for the measurements made by the interval counter. The interval counter cooperates with the microcomputer processor by producing an interrupt signal for use by the microcomputer processor.

DESCRIPTION OF THE PREFERRED EMBODIMENT

Figure 1:
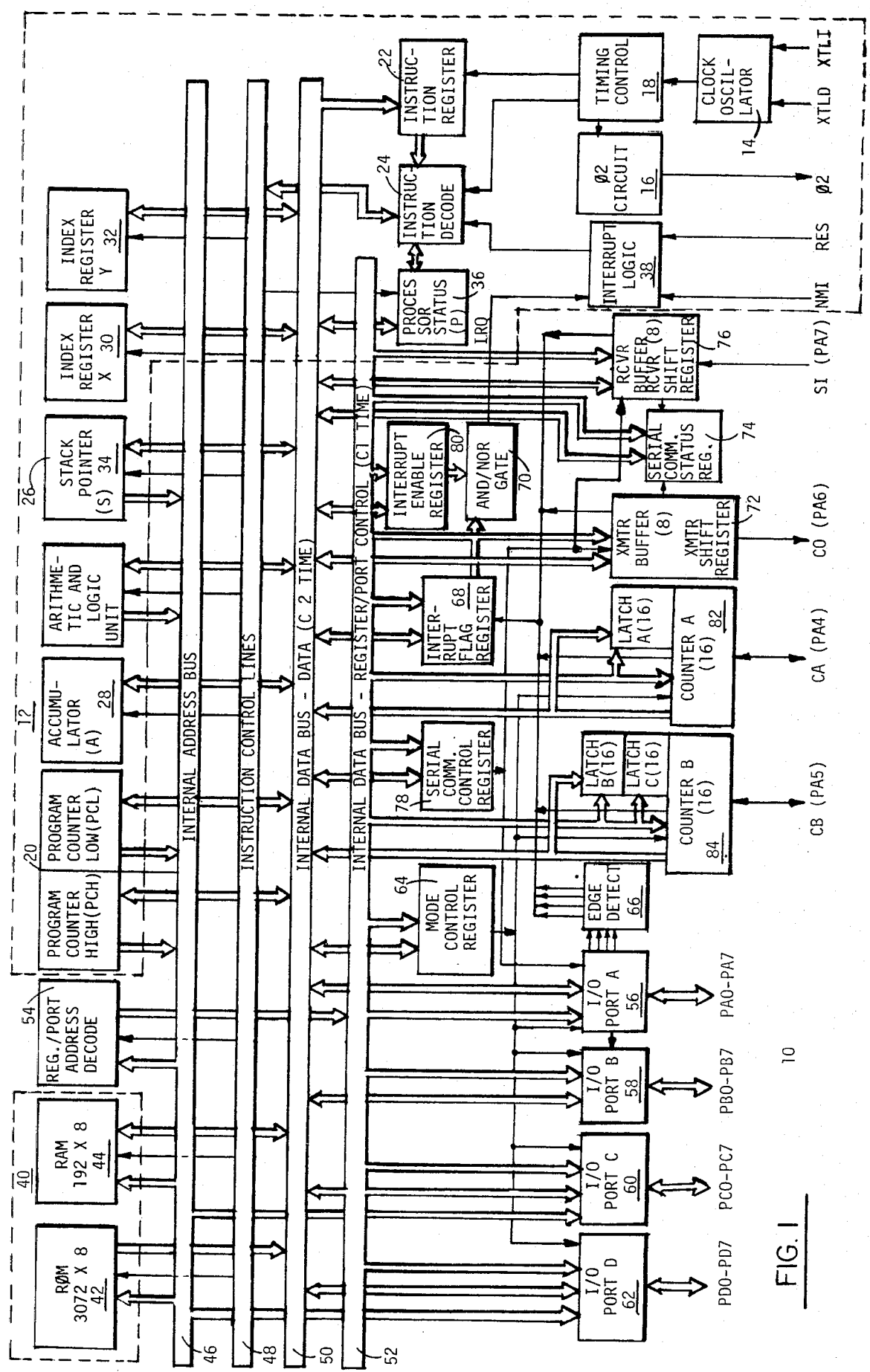
FIG. 1 is a schematic block diagram of a microcomputer incorporating an embodiment of the interval counter circuitry of this invention.

Referring first to FIG. 1, the microcomputer 10 of the preferred embodiment is a commercially available R6500/1 one-chip microcomputer available from Rockwell International Corporation, Anaheim, Calif., U.S. The microcomputer 10 is a complete, high performance, eight bit NMOS microcomputer on a single chip. The microcomputer 10 includes a central processing unit 12 which includes a clock oscillator 14, second phase frequency generator circuit 16, timing control logic 18, program counter 20 (a sixteen bit register divided into two eight bit sections), instruction register 22, instruction decoder 24, arithmetic and logic unit (ALU) 26, accumulator 28, index registers X and Y (30 and 32, respectively) used for general purposes or as displacements to modify the base address to obtain a new effective address, a stack pointer 34, a processor status register 36, and interrupt logic circuitry 38.

The microcomputer 10 includes memory 40 which includes both read only memory 42 and random access memory 44. The read only memory 42 contains the program instructions and other fixed constants for use by the microcomputer 10. The random access memory 44 may be used for read/write memory during operation of the microcomputer 10.

The microcomputer 10 includes an internal address bus 46, instruction control lines 48, and an internal data bus labeled 50 and 52. The data bus is labeled as two separate portions, 50 and 52, in FIG. 1 in order to reflect the fact that the data bus is time multiplexed in synchronism with the timing control 18 and clock second phase circuitry 16. This multiplexing of the data bus allows register and port control operations to proceed on the bus as represented in portion 52 during one clock phase (referred to as "C1 time"), and allows data transfer operations to proceed during the subsequent clock phase represented as bus 50 in FIG. 1 (referred to as "C2 time").

A register/port address decoder 54 provides control over the addressing of registers and input/output ports by controlling the operation of the bus 52. A group of input/output ports 56, 58, 60 and 62 are provided in the microcomputer 10 in order to allow the microcomputer 10 to be connected to external peripheral devices (not shown). A mode control register 64 is connected to the internal data bus 50 in order to control the operating mode of the microcomputer 10 and the handling of interrupts. An edge detector 66 is connected to the input/output port 56 in order to allow the sensing of transitions in the signals provided to the input output port 56 from an external peripheral device (not shown). An interrupt flag register 68 and AND/NOR gate 70 are connected to the interrupt logic 38 in order to handle the processing of interrupts by the microcomputer 10. Interrupt enable register 80 is connected to control the operation of gate 70.

As mentioned above, the data bus 52 allows register control operations during a clock phase referred to as "C1 time". The bus 52 may be used to specify a read or write operation from CPU 12 and also to specify an address location (from address decoder 54). The following description will refer to the contents of bus 52 as a read or write command combined with a hexadecimal number corresponding to a register address.

Serial communications are provided in the microcomputer 10 by a transmitter buffer and shift register 72, status register 74, receiver buffer and shift register 76, and serial communications control register 78.

Counter/latch circuitry 82 and 84 are connected inside microcomputer 10 in order to interface the microcomputer 10 to external devices (not shown).

Figure 2:
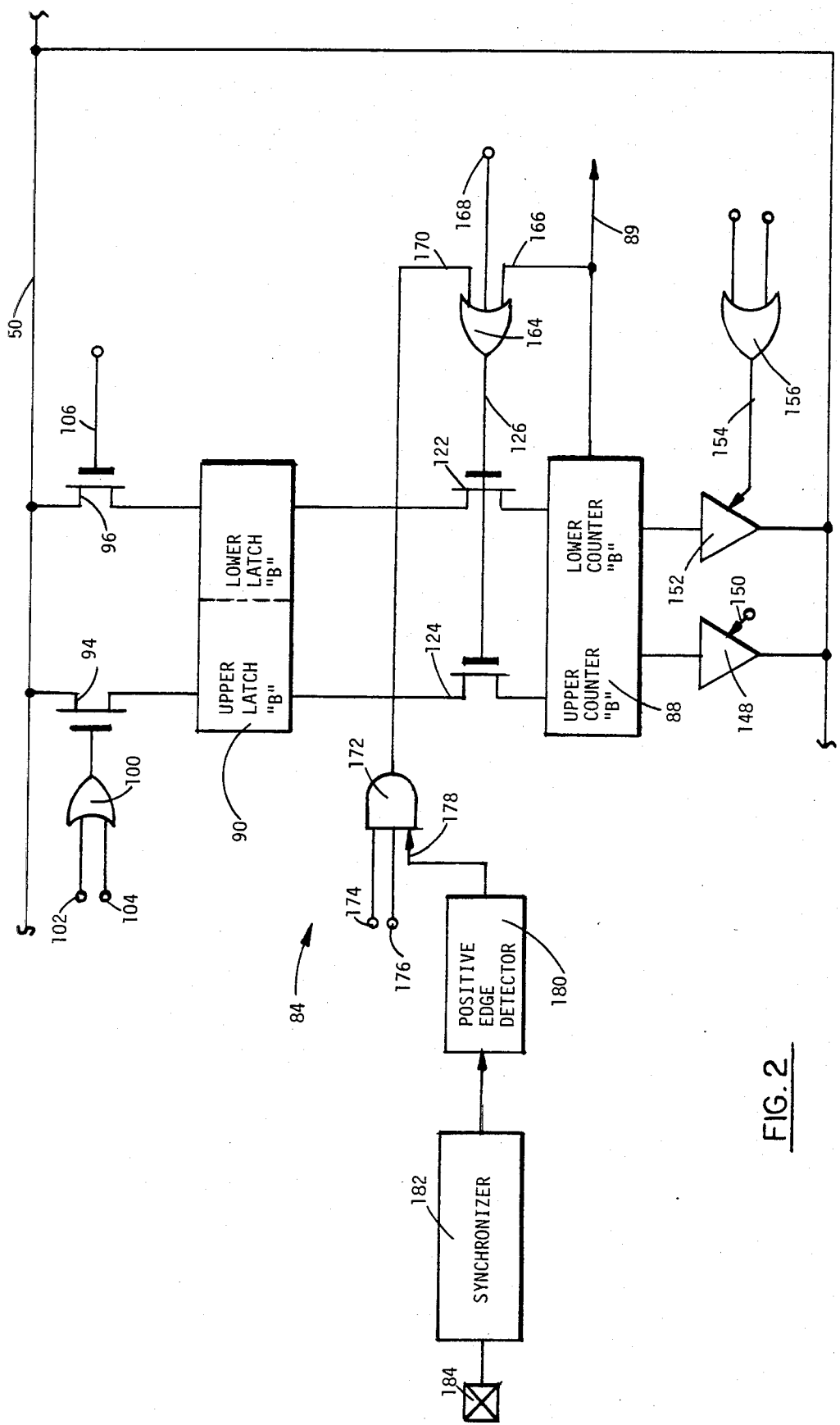
FIG. 2 is a schematic diagram showing the interval counter circuitry of this invention.

Referring next to FIG. 2, the counter/latch 84 includes the interval counter circuitry of this invention for producing an interrupt signal on the line 89. For convenience, the interval counter circuitry will be referred to by the reference number 84 (the same number as the counter/latch 84). FIG. 2 shows only those portions of the counter/latch 84 (see FIG. 1) which are relevant to this invention (interval counter circuitry), and omits portions of the circuitry which are unrelated to this invention and which would unnecessarily confuse the drawing figure. The signal on the line 89 is provided to the flag register 68 (see FIG. 1) so that the presence of a signal on the line 86 may be detected as a maskable interrupt by the microcomputer processor 12. The processor 12 and memory 40 control the operation of the circuitry 84 by controlling the period for sequential interrupts placed on the line 89, by controlling the starting or initiation of the measurement of time event intervals by the circuitry 84, and by controlling the loading of count information from the circuitry 84 on to the data bus 50. The processor 12 and memory 40 exert control over the circuitry 84 by controlling the contents of the data buses 50 and 52.

The interval counter circuitry 84 includes a sixteen bit decrementing counter 88 which is divided into two eight bit register portions, which are labeled as an "upper counter B" and a "lower counter B". The counter 88 may be loaded with a digital number and is connected to the timing control circuit 18 (see FIG. 1) so that the numerical contents of the counter 88 are decremented each time that a clock signal is received from the circuitry 18. The counter 88 produces an underflow signal on the line 89 after the counter 88 has decremented its contents (a count number) to zero.

The interval counter circuitry 84 also includes a storage register latch 90 which is preferably a sixteen bit buffer for holding a number (a multibit digital word) that may be loaded into the counter 88. The latch 90 is divided into two eight bit registers, labeled "upper latch B" and "lower latch B". The function of the latch 90 is to store preset time duration information (a digital number) received from the processor 12 and memory 40 through the bus 50, so that the stored preset number may be provided to the counter 88 for use in producing the interrupt signals on the line 89. The latch 90 holds a digital number which is used by the counter 88 in order to time the duration between successive events by counting the clock signals provided by the timing control 18 (see FIG. 1).

Bus gate 94 is connected between the bus 50 and the "upper latch B" portion of the latch 90. Bus gate 94 is shown schematically in FIG. 2 as a field effect transistor, and symbolizes an array of eight such transistors which have a control terminal 98 that allows eight bits of digital data to be transferred from the bus 50 and loaded into the upper eight bits of the latch 90. Similarly, gate 96 has a control terminal 106 and is connected between the bus 50 and the "lower latch B" portion of the latch 90 so that the lower eight bits of the latch 90 may be loaded from the bus 50.

The control terminal 98 for the bus gate 94 is connected to the output of an OR gate 100 having inputs 102 and 104. The gate inputs 102 and 104 are connected to respond to selected contents of the bus 52 (such as "write 001D" or "write 001E", respectively) in order to actuate the bus gate 94. The control terminal 106 is connected to respond to selected contents of the bus 52 (such as "write 001C") to control the actuation of the bus gate 96.

Down load transfer gates 122 and 124 have a common control terminal 126 and are connected between the latch 90 and the counter 88 so that the contents of latch 90 may be transferred to the counter 88. Gates 122 and 124 are similar in construction to gates 94 and 96. The control terminal 126 is connected to the output of a down load transfer gate 164 having inputs 166, 168 and 170. The input 168 of gate 164 is connected to respond to selected contents of bus 52 (such as "write 001E") so that the loading of counter 88 from the latch 90 may be controlled by the processor 12 and memory 40 through the bus 52.

The underflow signal line 89 from the counter 88 is connected to the input 166 of the down load transfer gate 164. The input 170 of the down load transfer gate 164 is connected to the output of AND gate 172, which has inputs 174, 176 and 178. The inputs 174 and 176 of AND gate 172 are connected to the mode control register 64 (see FIG. 1) so that the processor 12 may control the operation of the interval counter circuitry 84.

An external signal input pin 184 is provided on the microcomputer 10 so that a signal representing the occurrence of external events may be applied to the pin 184 and detected by the microcomputer 10. The input signal applied to the pin 184 is interpreted as being a signal level which makes positive transitions in signal level each time that an external event occurs. Synchronizer circuitry 182 has its input connected to the pin 184 in order to selectively delay the input signal transitions so that the input signal transitions are synchronized with the clock signals produced by the timing control circuitry 18 (see FIG. 1). The selective amounts of delay provided by the synchronizer circuitry 182 insure that transitions of the input signal on the pin 184 are brought into synchronism with operation of the counter register 88.

Positive edge detector circuitry 180 has its input connected to the output of the synchronizer circuitry 182, and has its output connected to the input 178 of the AND gate 172. The function of the edge detector circuitry 180 is to produce a retrigger signal each time the input signal (as delayed by the synchronizer 182) makes a positive level transition.

The function of the AND gate 172 is to allow retrigger signals from the input 178 to be presented on the line 170 only when the mode control register 64 (see FIG. 1) produces the appropriate mode control inputs on the lines 174 and 176. The function of the down load transfer gate 164 is to cause the loading of the contents of the latch 90 into the counter 88 when a retrigger signal is received on the line 170, when a control signal is received on the line 168 from the processor 12, or when an underflow signal is received on the line 166 from the counter 88. The gate 164 automatically reloads the counter 88 with the preset number from the latch 90 each time that a positive transition occurs on the input pin 184 (as reflected by the retrigger signal on line 170). Also, the latch 164 automatically reloads the counter 88 with the preset number from the latch 90 each time that the counter register 88 decrements its contents to zero and produces an underflow signal on the line 89.

A counter gate 148 has a control electrode 150 and is connected between the upper eight bits of counter 88 and the bus 50 so that the contents of counter 88 may be loaded onto the bus 50. The processor 12 controls the loading of the bus 50 by placing a selected hexadecimal number (preferably 001D) on the bus 52 so that the control electrode 150 is actuated. Similarly, counter gate 152 has a control electrode 154 and is connected between the lower eight bits of the counter 88 and the bus 50. The control electrode 154 is connected to the output of an OR gate 156 having its inputs connected to respond to the presence of a read command and the presence of a selected hexadecimal numbers (preferably 001C or 001E) present on the data bus 52. The counter gates 148 and 152 allow the contents of the counter 88 to be determined by the processor 12 during operation of the circuitry 84. Gates 148 and 152 allow the microcomputer 10 to read the contents of the counter 88 at any time in order to precisely determine time intervals.

Before the circuitry 84 is used by the microcomputer 10 to measure time interval durations for input signals on the pin 184, the buffer latch 90 is loaded with a sequence of binary digits in the form a word which represents a preset time duration. The present time duration is information which is specified by the microcomputer 10 in order to control operation of the circuitry 84 by specifying the initialization number which will be loaded into the counter 88 from the latch 90 each time that the down load transfer gate 164 is actuated. The present time duration number stored in the latch 90 is used to set the threshold interval time duration. Intervals between successive input signals which are measured to be shorter than the threshold time will be rejected by the interval counter 84 so that no interrupt signal will be produced on the line 89 for such short intervals. During the operation of the interval counter 84, the counter 88 decrements its contents each time that a clock signal is received from the circuitry 16 (see FIG. 1) until the counter 88 reaches zero. When the counter 88 reaches zero, it is automatically reloaded by the gate 164 which responds to the underflow signal 89 in order to transfer whatever number is contained in the latch 90 to the counter 88. After the counter 88 has been reloaded from the latch 90, it continues to decrement its contents in order to repeat the cycle. The underflow signal line 89 is provided to the interrupt register 68 (see FIG. 1) which forms a maskable interrupt so that the processor 12 may respond to the interval counter circuitry 84 when the counter 88 underflows.

Figure 3:
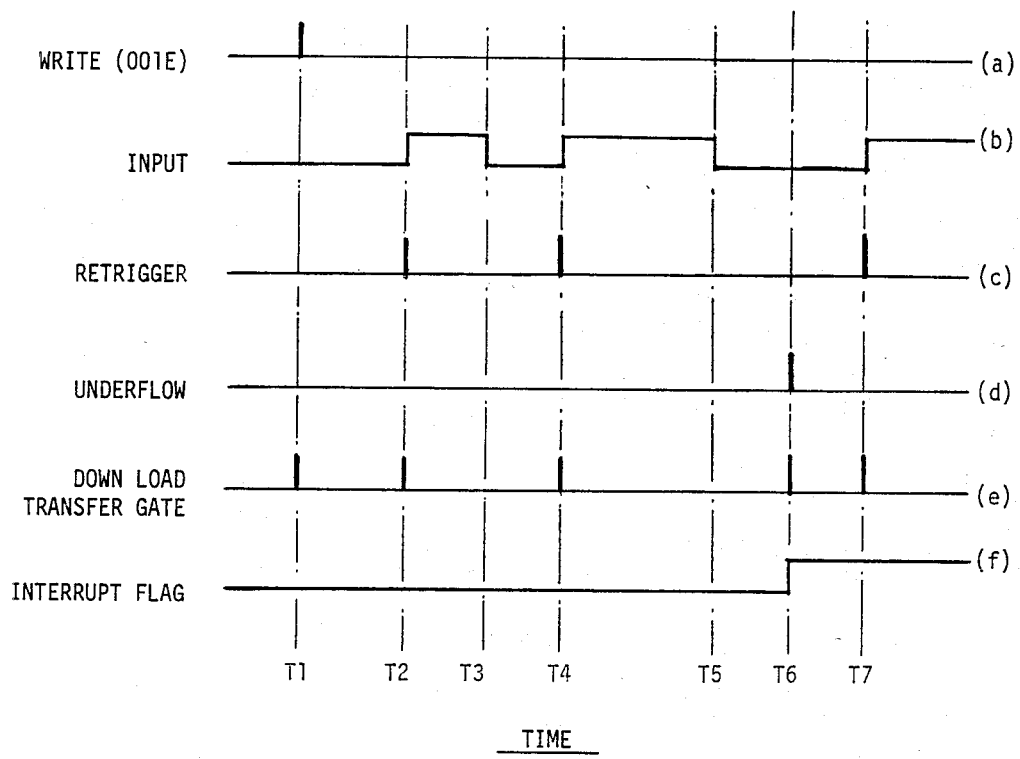
FIG. 3 is a timing diagram showing signal waveforms produced in the operation of the circuitry shown in FIG. 2 and displaying the time behaviour of the input signal and the resultant interrupt signal which is produced.

Referring next to FIG. 3, the waveforms a through f are shown horizontal lines with time increasing from left to right. Particular time points are denoted T1 through T7 and are shown as dashed, vertical lines. The waveforms a through f are labeled with descriptive terms including the terms "write 001E", "input", "retrigger", "underflow", "down load transfer gate", and "interrupt flag", corresponding to the function which each signal represents.

The waveform a (labeled "write 001E") corresponds to the signal which is derived from the bus 52 (see FIG. 1) and applied to the gate inputs 104 and 168 (see FIG. 2) in order to simultaneously load data into the "upper latch B" of latch 90 from the bus 50, and into the counter 88 from the latch 90. The waveform a produces an enabling signal at the time T1 in order to cause the loading of the latch 90 and counter register 88.

The waveform b (labeled "input") is an example typical of the type of input waveforms measured by the circuitry 84. The sample input waveform b makes positive or rising edge transitions at times T2, T4, and T7, and makes negative or falling edge signal transitions at the times T3, and T5. The waveform b is typical of the input signal waveform applied to the input pin 184 (see FIG. 2).

The signal waveform c (labeled "retrigger") corresponds to that produced on the input line 170 (see FIG. 2) by action of the synchronizer 182, positive edge detector 180, and gate 172. Due to the edge detecting function performed by the edge detector 180, the retrigger signal c produces enabling signals at the times T2, T4, and T7, as shown, corresponding to the positive signal transitions or rising edges of the input waveform b.

The signal waveform d (labeled "underflow") corresponds to the underflow signal produced on the line 89 by the counter register 88.

The signal waveform e (labeled "down load transfer gate") corresponds to the signal produced on the line 126 by the gate 164 in order to control the loading of the counter register 88 from the latch 90. As shown, the down load transfer gate waveform e includes enabling signals at the times T2, T4, and T7 corresponding to the receipt by the gate 164 of the retrigger signals (waveform c) on the input line 170. Also, the down load transfer gate waveform e includes an enabling signal at the time T1 corresponding to the "write 001E" enabling signal of waveform a which is received on the input 168 to gate 164. The down load transfer gate waveform e also includes an enabling signal at the time T6 corresponding to the receipt of an underflow signal (waveform d) on the line 166 to the gate 164.

The waveform f (labeled "interrupt flag") corresponds to the flag produced in the interrupt flag register 68 (see FIG. 1) due to the receipt by the register 68 of the underflow signal (waveform d) on the line 89. The interrupt flag waveform f shows that the processor 12 is presented with a maskable interrupt at the time T6 corresponding to the production of an underflow signal on the line 89 (see FIG. 2).

While the preferred embodiment of the invention has been shown and described above, various modifications and changes may be made without departing from the true spirit and scope of the present invention. For example, a sixteen bit data bus structure may be utilized which does not require the separate loading of upper and lower eight bit contents for the latch 90. Also, the counter 88 may be operated as an up-counter which may be incremented from a preset number in order to interrupt processor 12 if the counter 88 overflows prior to the receipt of an input signal. While it is preferable that the interval counter circuitry 84 be incorporated on a single silicon chip with the microcomputer circuitry 10 shown in FIG. 1, it would be possible to construct the interval counter 84 with discrete components as a non-integrated circuit.

What is claimed is:

1. A microcomputer having an interval counter for timing the duration between successive input signals so as to provide a maskable output interrupt signal which is indicative of said time duration and to which said microcomputer is responsive, said interval counter comprising:
    receiving means for storing a preset count number corresponding to a preset time duration;
    counting means for periodically decrementing a count number and producing said output interrupt signal when said count number is fully decremented and when the time interval between said input signals exceeds the count number; and
    control means responsive to the receipt of said input signals in order to cause said preset count number to be transferred from said receiving means to said counting means.

2. The interval counter of claim 1, wherein said control means responds to the production of an output interrupt signal by causing said preset number to be transferred from said receiving means to said counting means.

3. The interval counter of claim 1, wherein said control means prevents said counting means from producing an output interrupt signal when an input signal is received before said count number is fully decremented.

4. The interval counter of claim 1, wherein said receiving means comprises a digital latch for connection to a data bus so that a preset number in the form of digital binary bits corresponding to a desired preset time duration may be specified by loading said digital binary bits into said latch, and so that said digital binary bits may be transferred from said latch to said counting means when allowed by said control means.

5. The interval counter of claim 1, wherein said counting means comprises a digital down-counter for periodically decrementing the count number contained in said counter, and for producing an underflow timing indication when said count number has been decremented to zero.

6. The interval counter of claim 1, wherein said control means comprises:
    a down-load transfer gate for transferring numbers from said receiving means to said counting means;
    an OR gate having its output connected to actuate said down-load transfer gate, and having inputs responsive to said output interrupt signal of said counting means, and to said input signals so that the receipt of either said output interrupt signal or an input signal will cause the contents of said counting means to be set to said preset number contained in said receiving means.

7. The interval counter of claim 1 further comprising an edge detector means connected to said control means in order to condition said input signals by detecting the transitions in signal level of said input signals.

8. The interval counter of claim 1 further comprising a synchronizer means connected to said control means in order to selectively delay said input signals so that the receipt of said input signals by said control means is synchronized with the operation of said counting means.

9. A microcomputer having a central processor for executing instructions, memory for storing data and instructions, and a data bus for transferring information, wherein the improvement comprises an interval counter for measuring the time interval between successive input signals and providing a maskable output interrupt signal which is indicative of the time interval measured and to which said processor is responsive, said interval counter comprising:

receiving means for receiving initialization information from said data bus;

counting means for producing said output interrupt signal in response to said input signals and after a duration specified by said initialization information, and for providing said output interrupt signal to said processor; and control means connected to control said receiving means and said counting means so that when said output interrupt signal is received from said counting means, said control means initializes said counting means by automatically transferring said initialization information from said receiving means to said counting means.

10. The microcomputer of claim 9, wherein said initialization information defines a threshold interval duration so that time intervals longer than said threshold duration will cause an output interrupt signal to be produced by said interval counter, and so that time intervals shorter than said threshold duration will not cause an output interrupt signal to be produced by said interval counter.

11. The microcomputer of claim 9, wherein said receiving means comprises a digital buffer latch having inputs for the loading of a preset number as initialization information, and said interval counter further comprises a bus gate connected to said latch inputs and responsive to said processor for transferring a preset number from said data bus to said receiving means.

12. The microcomputer of claim 9, wherein said counting means comprises a digital down-counter for containing a digital count number and for periodically decrementing the count number to produce said an output interrupt signal when said count number has been decremented to zero.

13. The microcomputer of claim 12, wherein said counter has outputs and said interval counter further comprises a counter gate connected to said counter outputs and responsive to said processor for the transferring of said count number to said data bus.

14. The microcomputer of claim 9, wherein said control means comprises an OR gate having its output connected to control the transfer of specification information from said receiving means to said counting means, and having its inputs connected to respond to said an output interrupt signal of said counting means, and to respond to said input signals.

15. The microcomputer of claim 14, wherein said OR gate further has an input connected to respond to said processor so that processor instructions may be used to reset said counting means.

16. The microcomputer of claim 9 further comprising an edge detector means connected to said control means in order to condition said input pulses by detecting the transitions in signal level of said input pulses.

17. The microcomputer of claim 9 further comprising a synchronizer means connected to said control means in order to selectively delay said input signals so that the receipt of said input signals by said means for controlling is synchronized with the operation of said counting means.

18. The microcomputer of claim 9 further comprising a clock signal generating means connected to provide timing control to said processor and to said counting means.

19. An interval counter microcomputer for measuring the interval between successive input signals, said microcomputer comprising:

counting means for producing a timing indication when the time interval between successive input signals exceeds a preset time interval, said counting means repeatedly decrementing a preset count number which corresponds to said preset time interval and which has become fully decremented during the time interval between said input signals; and processor means responsive to said timing indication for determining the interval between successive input signals.

20. The microcomputer of claim 19, wherein said counting means is retriggerable so that the production of timing indications is begun anew with the receipt of each of said input signals.

* * * * *

UNITED STATES PATENT AND TRADEMARK OFFICE
CERTIFICATE OF CORRECTION

PATENT NO. : 4,538,235

DATED : August 27, 1985

INVENTOR(S) : Jerrold V. Henning

It is certified that error appears in the above-identified patent and that said Letters Patent are hereby corrected as shown below:

Column 3, line 5, change "acting" to "action".

Column 6, line 54, change "present" to "preset".

Signed and Sealed this

Sixth Day of May 1986

[SEAL]

Attest:

Attesting Officer

DONALD J. QUIGG

Commissioner of Patents and Trademarks